US008430451B1

(12) United States Patent
Heinz

(10) Patent No.: US 8,430,451 B1
(45) Date of Patent: Apr. 30, 2013

(54) CHILD CAR SEAT WITH INTEGRAL HEATING APPARATUS

(76) Inventor: Lisa D. Heinz, Brighton, CO (US)

( * ) Notice: Subject to any disclaimer, the term of this patent is extended or adjusted under 35 U.S.C. 154(b) by 625 days.

(21) Appl. No.: 12/617,073

(22) Filed: Nov. 12, 2009

Related U.S. Application Data

(60) Provisional application No. 61/198,779, filed on Nov. 12, 2008.

(51) Int. Cl.
A47C 7/72 (2006.01)

(52) U.S. Cl.
USPC ............... 297/180.12; 297/217.3; 297/256.16

(58) Field of Classification Search ............... 297/180.1, 297/180.12, 217.3, 250.1, 256.16
See application file for complete search history.

(56) References Cited

U.S. PATENT DOCUMENTS

| | | | |
|---|---|---|---|
| 5,516,189 A | 5/1996 | Ligeras | |
| 5,624,156 A * | 4/1997 | Leal et al. | 297/217.4 |
| 5,897,162 A * | 4/1999 | Humes et al. | 297/180.12 |
| 6,073,998 A | 6/2000 | Siarkowski et al. | |
| 6,127,655 A | 10/2000 | Humes et al. | |
| 6,194,687 B1 | 2/2001 | Joseph et al. | |
| D450,935 S | 11/2001 | Dranschak et al. | |
| D469,998 S | 2/2003 | Feeney | |
| 6,863,286 B2 * | 3/2005 | Eros et al. | 280/47.38 |
| 7,039,207 B1 * | 5/2006 | Elrod et al. | 381/301 |
| 7,045,743 B2 | 5/2006 | Park | |
| 7,152,412 B2 * | 12/2006 | Harvie | 62/3.5 |
| 7,196,289 B2 * | 3/2007 | Ellis et al. | 219/217 |
| 7,197,801 B2 | 4/2007 | Bajic et al. | |
| 7,320,223 B1 * | 1/2008 | Dabney et al. | 62/3.3 |
| 7,439,866 B2 * | 10/2008 | Wallner et al. | 340/573.1 |
| 2006/0138819 A1 * | 6/2006 | Omar | 297/217.3 |
| 2007/0296254 A1 * | 12/2007 | Kahn | 297/256.16 |
| 2009/0072594 A1 * | 3/2009 | Korytowski | 297/180.12 |
| 2009/0278389 A1 * | 11/2009 | Pos | 297/217.3 |

* cited by examiner

Primary Examiner — David Dunn
Assistant Examiner — Philip Gabler
(74) Attorney, Agent, or Firm — Montgomery Patent & Design; Robert C. Montgomery

(57) ABSTRACT

A child's car seat with an integral heating apparatus is herein disclosed, comprising a flexible electric heating pad layer immediately below back and seat portions of the car seat. The heating pad is connected to a rechargeable battery located therewithin a base portion of the car seat. A remote control unit provides settings of "OFF", "LOW", "MED", and "HIGH" and would allow the apparatus to be controlled from the front seat while the vehicle is in motion. At the "HIGH" setting, the maximum temperature obtainable would be limited to an appropriate temperature to prevent overheating of the child.

9 Claims, 5 Drawing Sheets

CHILD CAR SEAT WITH INTEGRAL HEATING APPARATUS

RELATED APPLICATIONS

The present invention was first described in and claims the benefit of U.S. Provisional Application No. 61/198,779, filed Nov. 12, 2008, the entire disclosures of which are incorporated herein by reference.

FIELD OF THE INVENTION

The present invention relates generally to child safety seats for automobiles, and in particular, to a remote controlled integrally heated child car seat.

BACKGROUND OF THE INVENTION

Child safety seats for automobiles are recognized as an important safety feature and one of the things which makes it possible to safely transport small children in vehicles on a regular basis. Such safety seats provide additional protection against collisions and other jarring movements of the vehicle which would otherwise take a toll on such small, undeveloped children. In addition, they provide enhanced securement to make sure that the child stays firmly in place.

A distinct disadvantage of such car seats is that they are designed with more of an eye towards safety than towards comfort. The thin pads, awkward shapes, and hard plastic shells can make for a very uncomfortable trip. Such child car seats can easily put the child in a bad mood by subjecting them to hard surfaces, uncomfortable positioning, and extreme temperatures. This in turn leads to annoyance and extra exertion on the part of the responsible parents or caretaker. Such distractions can be unpleasant, or at worst, even more dangerous. In particular, extremely cold weather conditions are exacerbated by the construction of many standard car seats. Even blankets are hard pressed to keep a child comfortable. The hard plastic and metal construction of such seats is hardly mitigated by the thin, poorly insulated pads disposed on many such seats.

Various attempts have been made to provide a comfortable, warm seating arrangement for a child. Examples of these attempts can be seen by reference to several U.S. patents. U.S. Pat. No. 6,073,998, issued in the name of Siarkowski et al., describes a seat warmer. The Siarkowski device is a portable, flat, flexible heating pad which may be placed on most surfaces.

U.S. Pat. No. 6,194,687, issued in the name of Joseph et al., describes a child car seat heating surface. The Joseph device overlays a car seat and has apertures for fastening the device securely to the seat.

U.S. Pat. No. 7,197,801, issued in the name of Bajic et al., describes an automotive vehicle seat insert. The Bajic apparatus is an integral heating means for installation into standard vehicle seats.

Additionally, ornamental designs for heated seats and child safety seats exist, particularly U.S. Pat. Nos. D 450,935 and D 469,998. However, none of these designs are similar to the present invention.

While these devices fulfill their respective, particular objectives, each of these references suffer from one (1) or more of the aforementioned disadvantages. Many such devices are not adaptable to child safety seats. Also, many such devices are not portable in a manner which allows them to be powered in a vehicle. In addition, many such devices cannot be accessed or controlled by caretakers or parents in a manner which is simple and safe while occupying a moving motor vehicle. Furthermore, many such devices are difficult to adapt to child safety seats. Accordingly, there exists a need for a seat heating apparatus specifically tailored to child safety seats without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide safe, comfortable heating for a child in a car safety seat in a manner which simple and effective. Thus, the object of the present invention is to solve the aforementioned disadvantages and provide for this need.

To achieve the above objectives, it is an object of the present invention to comprise a battery-powered child's car seat with integral heating capabilities. The apparatus comprises a car seat assembly, a base assembly, and a remote control unit. The car seat assembly comprises a conventional child car seat with a plurality of internal heating elements. The base assembly provides a means by which to secure the car seat in place in a vehicle, as well as housing various electrical components. The remote control unit comprises a remote control which may be utilized in a "hand-held" manner or be mounted to a dash area of a vehicle.

Another object of the present invention is to further comprise the car seat assembly of common and expected features of a conventional child's car seat, such as a padded textile cover, shoulder straps, a crotch strap, strap latches, arm rests, a pivotable carrying handle, and the like. The car seat assembly further comprises a plurality of heating elements located internally within seating and back surfaces of the car seat.

Yet still another object of the present invention is to further comprise the base of an integrally molded seatbelt tunnel feature which allows the apparatus to attach to a vehicle by routing an existing seatbelt. The apparatus provides quick and easy loading and unloading of the child seat assembly via a release clasp, a release catch, first and second rear latching features, and first and second front latching features.

Yet still another object of the present invention is to comprise the latching features of geometrically interlocking, matching pairs of plastic-molded features disposed at corresponding locations on the base and car seat assemblies. The release clasp and catch are located along a front surface of the car seat and base, respectively, and provide a spring-loaded engaging means for securely retaining the assemblies once the latches are in place.

Yet still another object of the present invention is to further comprise a removable rechargeable battery which provides 12-volt direct current (DC) power to the heating elements. The battery is stored within a battery compartment internal to the base assembly and is accessed through a front-mounted battery compartment door and latch.

Yet still another object of the present invention is to provide an electrical connection between the base and child seat assemblies via vertical mechanical engagement of corresponding pin-out connectors. The connectors are pre-aligned so as to engage coincidentally when the car seat assembly engages the base assembly.

Yet still another object of the present invention is to comprise a heating pad layer which resides immediately below the padded textile covering portions of the seating and back surfaces. The heating pad layer is surrounded by common foam filling portions of the car seat assembly. The heating pad layer provides heat to contacting seat and back areas of the occupying child.

Yet still another object of the present invention is for the heating pad layer to provide padded support to a plurality of integral heating elements using conventional textile sewing methods. The heating elements are routed within the heating pad layer in an equally-spaced pattern to provide evenly distributed heat to the child. The heating elements are power by the rechargeable battery in the base assembly.

Yet still another object of the present invention is to conduct DC power from the battery to a first controller within the base assembly via common internal wiring.

The first controller comprises a common plastic or metal enclosure which provides protection and a durable mounting means to internal electrical and electronic equipment. The equipment includes a printed circuit board, further comprising a voltage regulator a power supply circuit, a microprocessor, a relay, and a software memory chip.

Yet still another object of the present invention is to provide electrical communication between the first controller, a signal port, and the heating elements. The signal port receives wireless signals from the remote control unit, enabling the first controller to initiate heating current to flow from the battery into the heating elements based on user-selected heat settings. The remote control provides an additional capability of two-way signal communication to allow signals to be sent from the base assembly to the remote as well.

Yet still another object of the present invention is for the remote control unit to provide two-way wireless transceiver communication between a controller portion of the remote control and the first controller. In one (1) embodiment, the remote control unit utilizes a conventional wireless infrared signal transmission method. The unit further comprises an effective range of approximately ten (10) feet.

Yet still another object of the present invention is to comprise the remote control unit of a rectangular plastic housing with an operating control panel located on a front face. The panel displays information to convey the present operating status of the apparatus. The information is received wirelessly from a second controller portion of the base assembly. The information displayed includes real-time temperature, battery strength, and the like.

Yet still another object of the present invention is to comprise the operating control panel of electronic control switches which allow a user to turn the apparatus off, select various heating levels such as low, medium and high temperature, and the like. The first controller further comprises a high temperature limit thermostat set at a pre-determined temperature to disengage power to the heating pad layer if dangerously high temperatures are reached. In a preferred embodiment, the limit is sixty-eight degrees Fahrenheit (68° F.).

Yet still another object of the present invention is to power the second controller located in the base assembly with a small rechargeable or disposable battery. The second controller receives and transmits data and operating commands via an infrared transmitter. The second controller further comprises an output circuit which generates necessary electrical signals to display data from the base assembly and heating elements, including real-time temperature and the strength of the removable rechargeable battery.

Yet still another object of the present invention is to provide a method of utilizing the device that provides a unique means of quick and securely engaging the car seat and base assemblies, providing rechargeable battery power to integral heating elements of the car seat, and allowing a user to quickly and easily provide safe, comfortable heating to a child seated within the car seat.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
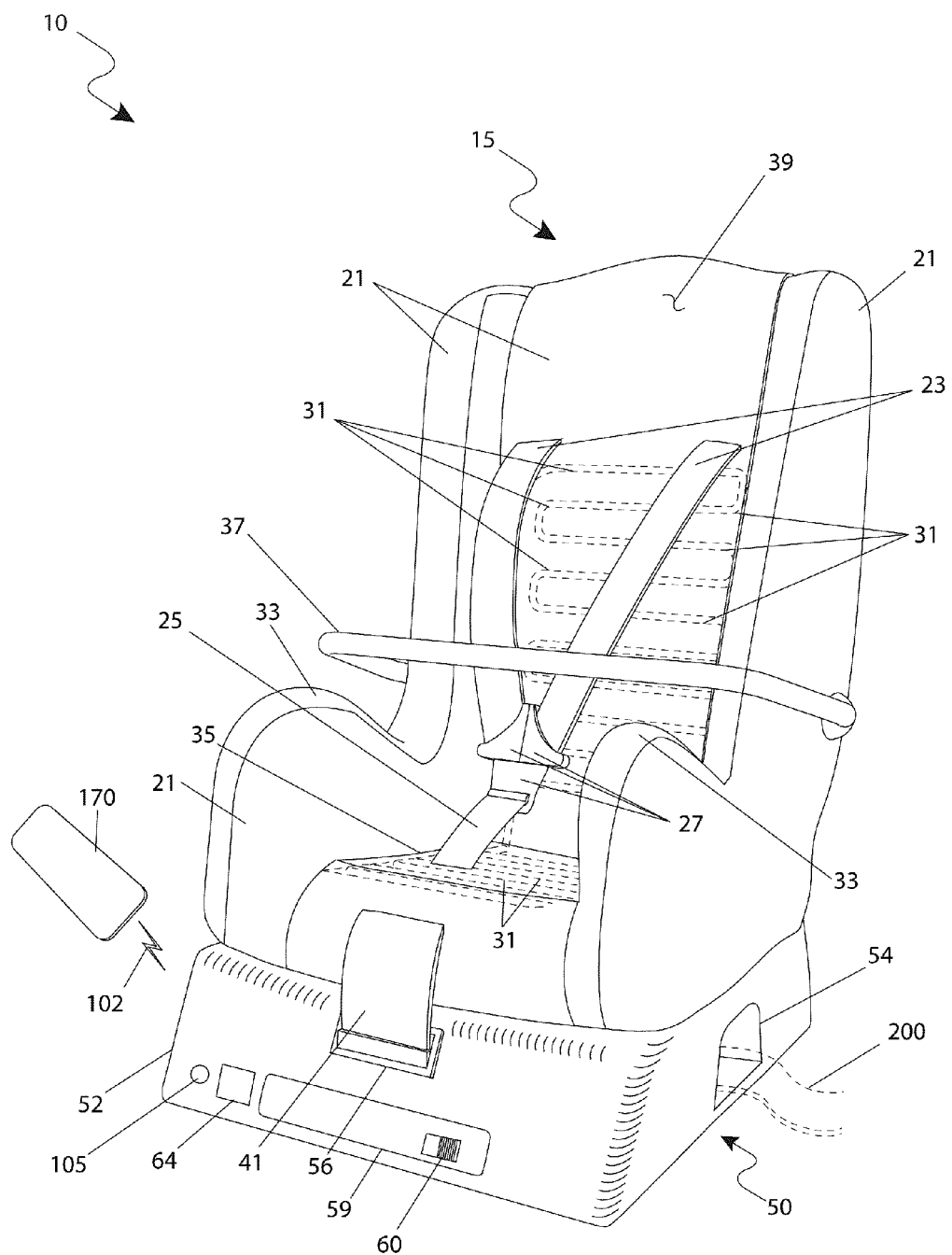
FIG. 1 is a perspective view of a child car seat with integral heating apparatus 10, according to the preferred embodiment of the present invention.

| | |
|---|---|
| 10 | child car seat with integral heating apparatus |
| 15 | car seat assembly |
| 17 | car seat shell |
| 19 | foam filling |
| 21 | padded textile covering |
| 23 | shoulder strap |
| 25 | crotch strap |
| 27 | strap latch |
| 29 | heating pad layer |
| 31 | heating element |
| 33 | arm rest |
| 35 | seating surface |
| 37 | handle |
| 39 | back surface |
| 41 | release clasp |
| 50 | base assembly |
| 52 | base shell |
| 54 | seat belt tunnel |
| 56 | release catch |
| 58 | first battery compartment |
| 59 | first battery compartment door |
| 60 | first battery compartment latch |
| 62 | first battery |
| 64 | first signal port |
| 66 | first receiver |
| 80 | first rear latching feature |
| 82 | second rear latching feature |
| 84 | first front latching feature |
| 86 | second front latching feature |
| 94 | first connector |
| 96 | second connector |
| 98 | wiring |
| 100 | first controller |
| 102 | wireless signal |

-continued

| | |
|---|---|
| 105 | first infrared light transmitting diode |
| 110 | first infrared driver |
| 115 | low-power relay |
| 120 | medium power relay |
| 125 | high power relay |
| 130 | power regulator |
| 135 | high temperature limit thermostat |
| 140 | thermistor |
| 150 | child |
| 170 | remote control unit |
| 172 | second signal port |
| 173 | second receiver |
| 174 | operating control panel |
| 176 | indicating light |
| 178 | electronic control switch |
| 180 | alphanumeric display |
| 182 | battery strength display |
| 184 | second infrared light transmitting diode |
| 186 | second infrared driver |
| 188 | second controller |
| 190 | first digital display driver |
| 192 | second digital display driver |
| 194 | second battery |
| 195 | second battery compartment door |
| 196 | second battery compartment fastener |
| 200 | seat belt |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a child car seat with integral heating apparatus (herein described as the "apparatus") 10, which provides a child's car seat 15 with an internal heating pad layer 29 located along a seating surface 35 and a back surface 39 of the child car seat assembly 15. The heating pad layer 29 is powered by a rechargeable first battery 62 mounted therewithin a base assembly portion 30 of the apparatus 10. The apparatus 10 also comprises a portable battery-powered remote control unit 170 providing selectable temperature settings as well as displaying an actual heated temperature of the apparatus 10. The remote control unit 170 may be utilized in a "hand-held" manner or be mounted thereto a dash area of a vehicle, thereby enabling convenient control of the apparatus 10 from a front seat location while the vehicle is in motion. The apparatus 10 is designed to be limited thereto a maximum obtainable temperature, preferably approximately sixty-eight degrees (68°), thereby preventing overheating of an occupying child 150.

Figure 2:
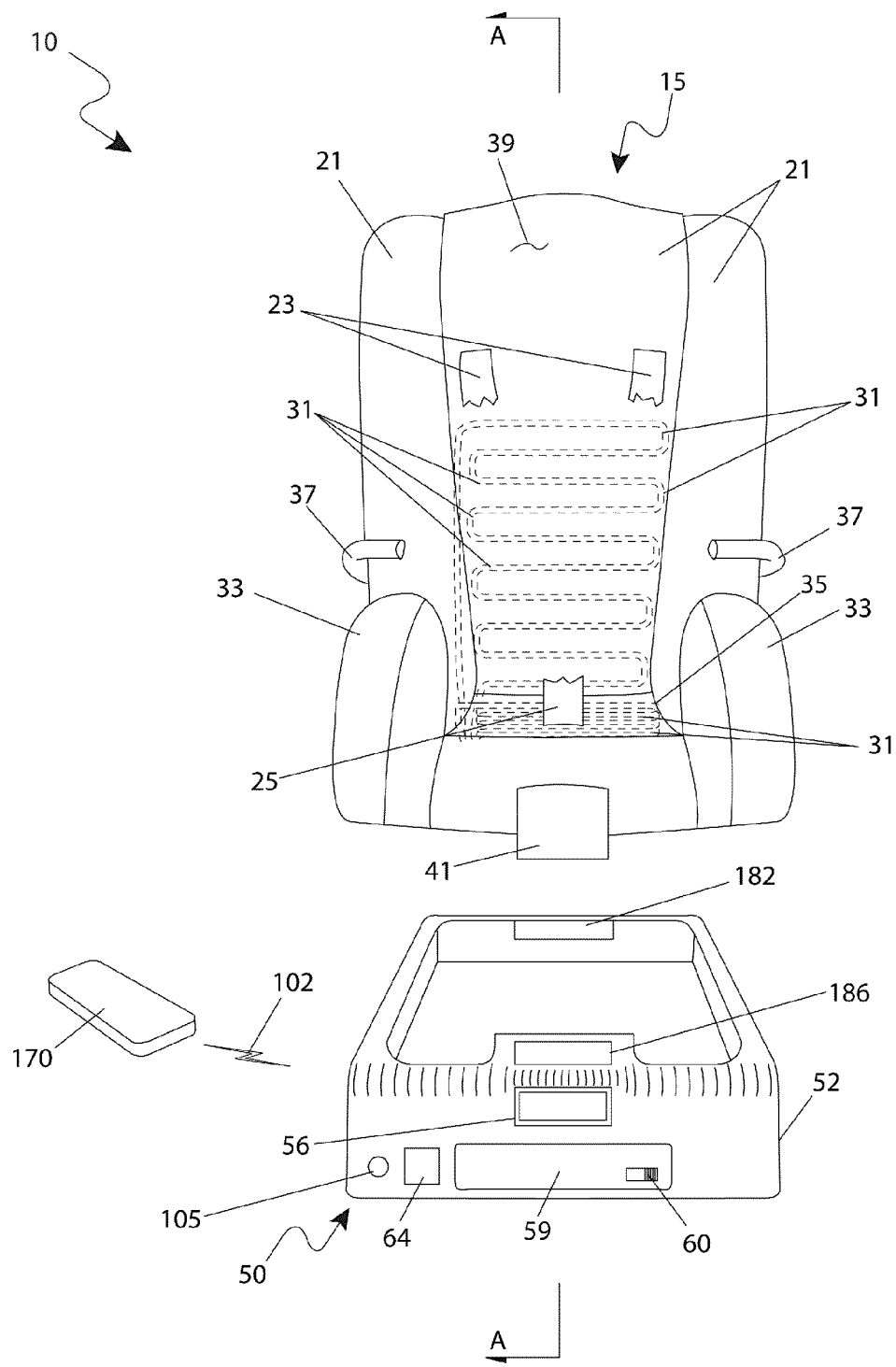
FIG. 2 is a front perspective view of the child car seat with integral heating apparatus 10 depicting a detached state, according to the preferred embodiment of the present invention.

Referring now to FIGS. 1 and 2, perspective and front views of the apparatus 10, according to the preferred embodiment of the present invention, are disclosed. The apparatus 10 comprises a car seat assembly 15 and a base assembly 50. The car seat assembly 15 generally follows standard and well known construction practices of conventional child car seats; however, said car seat assembly 15 comprises a plurality of internal heating elements 31 therewithin seating 35 and back 39 surfaces to provide warmth thereto an occupying child 150 (see FIG. 3). The car seat assembly 15 further comprises common and expected features such as, but not limited to: a padded textile cover 21, a pair of shoulder straps 23, a crotch strap 25, a strap latch 27, a pair of arm rests 33, and a pivoting carrying handle 37.

The apparatus 10 is depicted here comprising a two-piece unit wherein said car seat assembly 15 is removably attachable thereto a hard plastic base assembly 50 via a release clasp 41 mechanism. The base assembly 50 in turn provides attachment thereto a vehicle by routing an existing seatbelt 200 therethrough a seat belt tunnel feature 54 being integrally-molded thereinto the base assembly 50 as seen in FIG. 1. The shoulder 40 and crotch 25 straps are envisioned to be affixed securely thereto the back 39 and seat 35 surfaces, respectively, using common strong strapping elements being joined thereto each other using a conventional strap latch 27 in an expected manner. The car seat assembly 15 is envisioned to be made using common plastic, vinyl, and fabric materials and is envisioned to be introduced in a variety of attractive colors and patterns. The car seat assembly 15 further comprises a pivoting attachment means thereto a "U"-shaped handle 37 which extends therefrom opposing outer side surfaces of said car seat assembly 15 and may be positioned laterally in front of the occupying child 150 in a protective manner as well as pivoting upwardly to provide a means to grasp and carry the car seat assembly 15.

The apparatus 10 provides quick and easy loading and unloading of the child seat assembly 15 therefrom the base assembly 50 by a user or care giver. The apparatus 10 comprises a release clasp 41, a release catch 56, a first rear latching feature 80, a second rear latching feature 82, a first front latching feature 84, and a second front latching feature 86. The latching features 80, 82, 84, 86 comprise geometrically interlocking and matching pairs of plastic-molded features which are sequentially inserted thereinto each other and subsequently retained therein an engaged state via the spring-loaded release clasp 41 being engaged thereinto the release catch 56. The release clasp 41 and release catch 56 are located therealong front surfaces of the car seat assembly 15 and base assembly 50, respectively. However, it is understood that the method utilized to latch the car seat assembly 15 thereto the base assembly 50 is not limited to the described embodiment, and a person skilled in the art will appreciate that many other latching mechanisms, common in the industry, may be utilized without deviating from the basic concept, and as such should not be interpreted as a limiting factor of the apparatus 10.

The apparatus 10 receives 12-volt direct current (DC) power therefrom a removable rechargeable first battery 62, thereby providing a current thereto the aforementioned heating elements 31 therewithin the car seat assembly 15. Said first battery 62 is stored therewithin a battery compartment 58 which is internal to the base assembly 50. Said battery compartment 58 is accessed through a front-mounted first battery compartment door 59 using a first battery compartment latch 60 (see FIG. 2).

The apparatus 10 further provides an electrical connection therebetween the base assembly 50 and the child seat assembly 15, thereby conveying a flow of electrical current thereto the heating elements 31 via vertical mechanical engagement of a male first connector 94 and a female second connector 96. Said connectors 94, 96 comprise multiple pin-out construction having male/female molded features. Furthermore, said connectors 94, 96 are arranged so as to be pre-aligned and engaged in a coincidental engaging motion therewith the aforementioned latching features 80, 82, 84, 86 when installing the car seat assembly 15 thereto the base assembly 50. Said connectors 94, 96 provide enabling electrical circuitry therefrom the internally mounted first controller 100 located therewithin the base assembly 50, thereto the aforementioned heating elements 31 (see FIG. 3).

Initiating of a heating current thereto the heating element pad 35 is provided via a remote control unit 170 which provides two-way transceiver communication therebetween the second controller portion 188 of said remote control unit 170, and the first controller 100 within the base assembly 50. Said wireless communication is accomplished by exchange of wireless signals 102 to and from the base assembly 50 and remote control unit 170. Said wireless signals 102 are received via a first signal port 64 located on a front surface of the base assembly 50, and a second signal port 172 located thereupon an external surface of the remote control unit 170 (see FIGS. 4 and 5). The remote control unit 170 is envisioned to utilize a conventional wireless infrared signal transmission method; however, other signal transmission technologies may be utilized with equal benefit such as radio frequency (RF) or other current technologies and as such should not be interpreted as a limiting factor of the apparatus 10. The remote control unit 170 comprises a rectangular plastic housing which may be operated therein a hand-held manner or may be mounted in a semi-permanent manner thereat a convenient location within the vehicle using common fasteners such as, but not limited to: adhesives, holster-type holding fixtures, hook-and-loop type fasteners such as VELCRO®, or the like. The remote control unit 170 comprises an effective range of approximately ten (10) feet, thereby enabling the apparatus 10 to be easily controlled therefrom any location inside of a motor vehicle in much the same manner as a television remote control (see FIG. 4).

Figure 3:
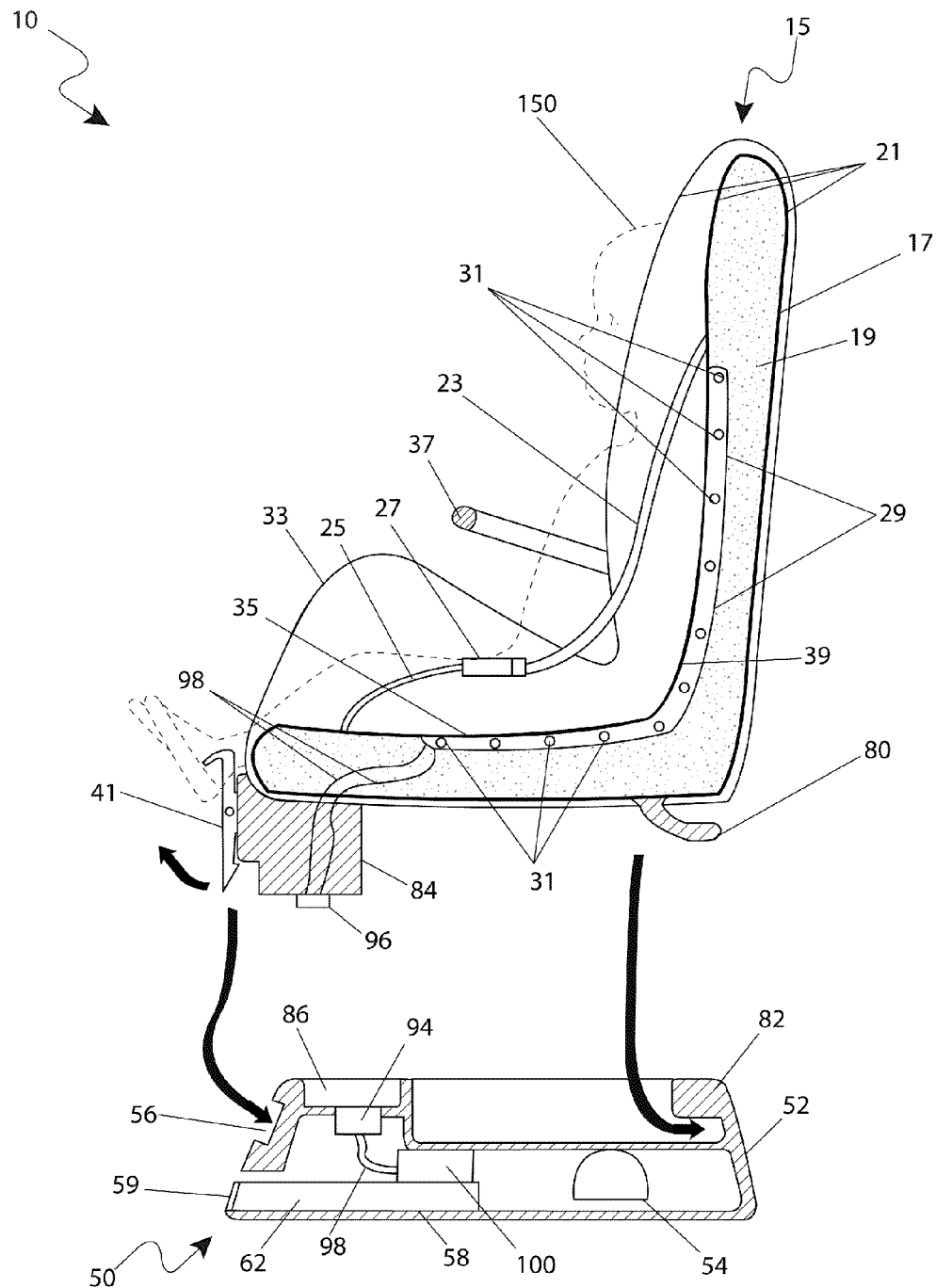
FIG. 3 is a section view taken along section line A-A (see FIG. 2) of the child car seat with integral heating apparatus 10, according to the preferred embodiment of the present invention.

Referring now to FIG. 3, a section view taken along section line A-A (see FIG. 2) of the apparatus 10, according to the preferred embodiment of the present invention, is disclosed. The apparatus 10 comprises a heating pad layer 29, a plurality of heating elements 31, a rechargeable first battery 62, and a first controller 100. The apparatus 10 provides integrated heating capabilities by the use of a textile heating pad layer 29. The heating pad layer 29 resides immediately below the padded textile covering portions 21 covering both the seating 35 and back 39 surfaces and is surrounded thereby common foam filling portions 19 of the car seat assembly 15. Said heating pad layer 29 provides heat thereto contacting seat and back areas of the occupying child 150 in a corresponding manner. The heating pad layer 29 provides padded support thereto a plurality of integral heating elements 31 using conventional textile sewing methods allowing said heating elements 31 to be routed therewithin said heating pad layer 29 therein an equally-spaced pattern such as serpentine, parallel, or zigzag pattern, thereby providing evenly distributed heat thereto the child 150. It is understood that said heating elements 31 may comprise one (1) or a plurality of parallel-wired flexible electric resistance type heaters that are well-known in the art and commonly used in other products such as electric blankets, heating pads and the like. The heating elements 31 are powered by the removable rechargeable first battery 62 which is located within the base assembly portion 50 of the apparatus 10.

The rechargeable first battery 62 is removably attached thereto the base assembly 50 via insertion thereinto the battery compartment portion 58, thereby establishing electrical communication therewithin said battery compartment 58 and corresponding wiring 98 via internal electrical connectors in a conventional manner. Said first battery 62 is secured in place by replacing the first battery compartment door 59 and engaging the first battery compartment latch 60. The first battery 62 is envisioned to be removed and taken thereinto a residence for recharging when the apparatus 10 is not in use. Recharging of the first battery 62 would be accomplished in a conventional manner which is well-known in the art.

Said DC electric power therefrom the first battery 62 is subsequently conducted thereto the first controller 100 via common internal wiring 98 within the base assembly 50. The first controller 100 comprises a common plastic or metal enclosure providing a protection and durable mounting means thereto internal electrical and electronic equipment including a printed circuit board further comprising a voltage regulator, a power supply circuit, a microprocessor, a relay, and a software memory chip. The first controller 100 is in electrical communication therewith the first signal port 64 and the heating elements 31. In use, the first signal port 64 receives a wireless signal 102 therefrom the remote control unit 170, thereby enabling the first controller 100 to initiate a heating current to flow therefrom said first battery 62 thereto the heating elements 31 based upon user-selected heat settings stored within said remote control unit 170 (see FIG. 4).

Figure 4:
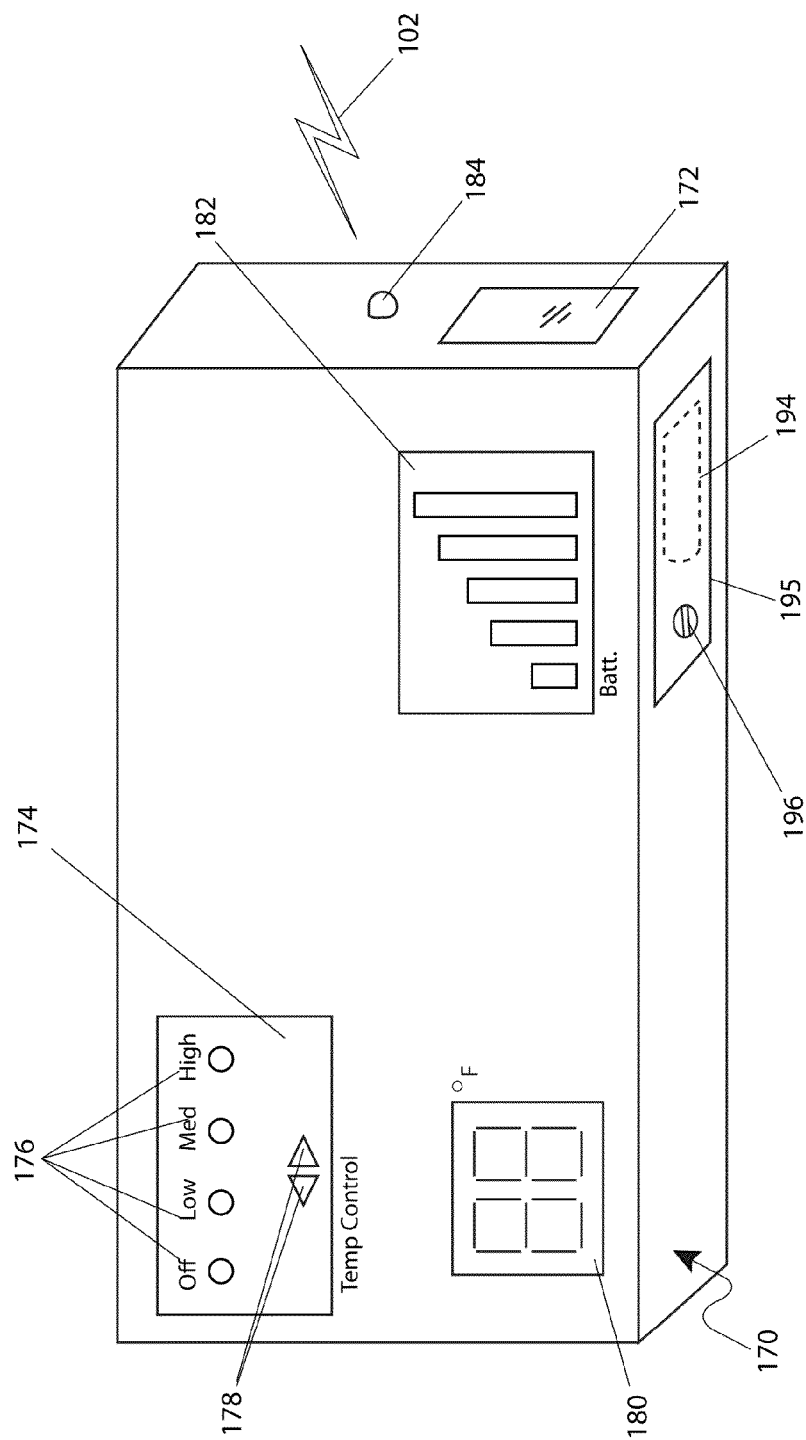
FIG. 4 is a perspective view of a remote control unit portion 170 of the child car seat with integral heating apparatus 10, according to the preferred embodiment of the present invention; and, FIG. 5 is an electrical block diagram depicting the major electrical components of the child car seat with integral heating apparatus 10, according to the preferred embodiment of the present invention.

Referring next to FIG. 4, a perspective view of the remote control unit portion 170 of the apparatus 10, according to the preferred embodiment of the present invention, is disclosed. The remote control unit 170 operates in much the same manner as a conventional remote control used to control household electronics; however, said remote control unit 170 provides an additional capability of two-way signal communication. The remote control unit 170 is powered by an internal second battery 194 envisioned to comprise one (1) or more small rechargeable or disposable batteries which are accessed using a second battery compartment door 195 secured with a second battery compartment fastener 196.

An operating control panel 174 is located on the face of the remote control unit 170 and displays particular information which conveys the present operating status of the apparatus 10. Said information is received via a wireless signal 102 initiated therefrom the first controller portion 100 of the base assembly 50. Information displayed upon the operating control panel 174 includes real-time temperature of the heating pad layer 29 being displayed thereupon an alphanumeric digital display 180. Additionally, the operating control panel 174 displays a strength of the first battery 62 thereupon a battery strength display 182 using a digital "bar chart"-type graphical representation. Display images thereupon said alphanumeric display 180 and battery strength display 182 are envisioned to utilize common display technologies such as light emitting diodes (LED), liquid crystal diodes (LCD), or other current technologies. The information provided by the alphanumeric display 180 and battery strength display 182 allows a parent or care provider to make educated decisions about control and use of the apparatus 10 during various weather conditions.

The operating control panel 174 also comprises two (2) increment/decrement electronic control switches 178 which provide a parent or care provider an ability to turn the apparatus 10 off, or select various heating levels such as a low temperature, a medium temperature, or a high temperature. The user selected heating level is in turn transmitted via a wireless signal 102 thereto the first controller 100 within the base assembly 50 which maintains the heating pad layer 29 thereat the desired selected heating level. The selected heating level is displayed thereupon the operating control panel 174 via a plurality of corresponding indicating lights 176 comprising respective "OFF", "LOW", "MED", and "HIGH" indicia, thereby communicating a current status of the apparatus 10 to the user.

Figure 5:
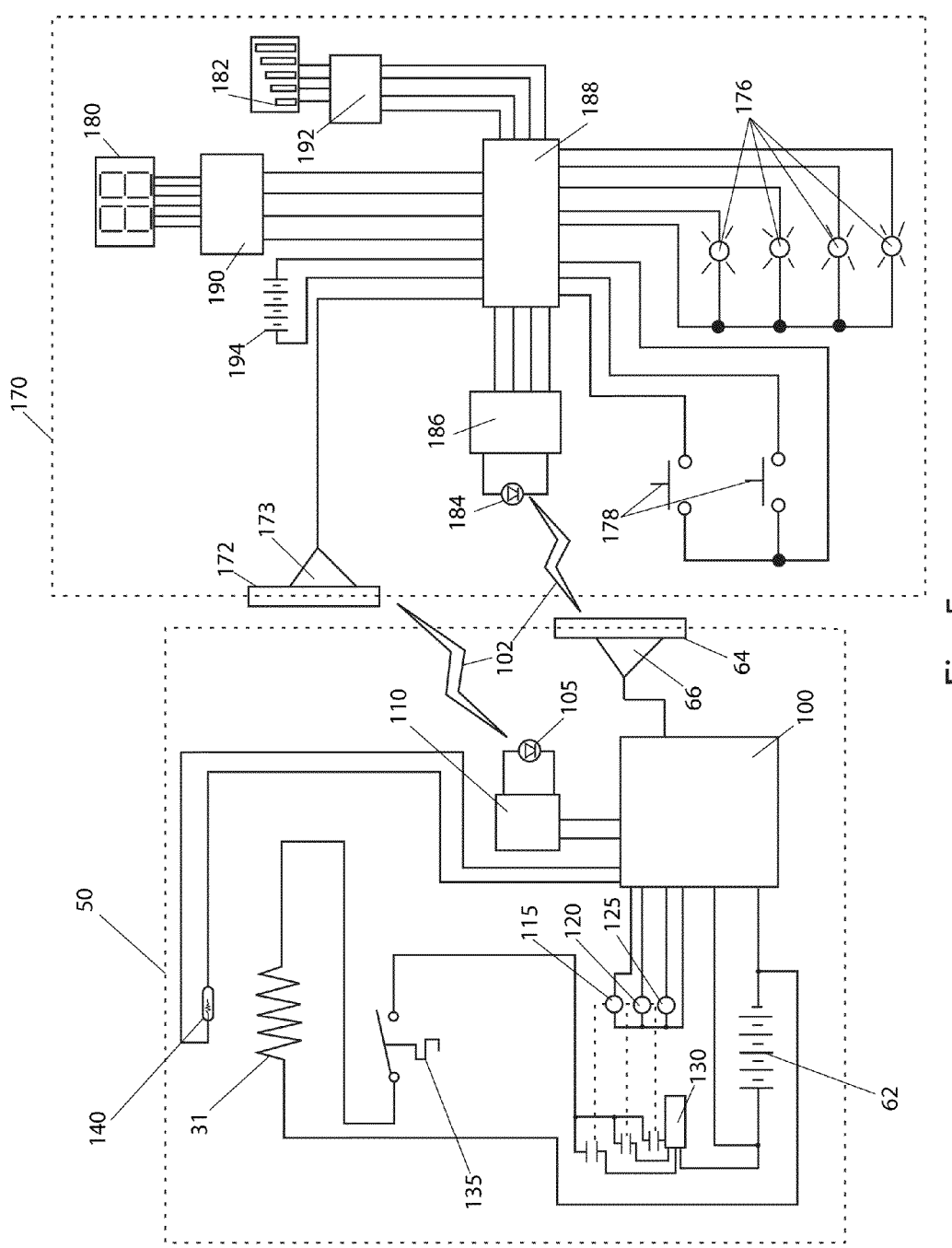

Referring now to FIG. 5, an electrical block diagram of the apparatus 10, depicting the major electrical components of the apparatus 10, according to the preferred embodiment of the present invention, is disclosed.

The base assembly 50 comprises a first controller 100 which receives DC power therefrom the rechargeable first battery 62. Said first controller 100 is envisioned to comprise a common basic stamp module being similar to other programmable systems which are well known in the art. The first controller 100 receives and transmits data and operating commands from/to the remote control unit 170 via infrared signals 102. Said wireless communication is accomplished by exchange of said wireless signals 102 transmitted thereby a first infrared transmitting diode 105 within the base assembly 50 and a second infrared transmitting diode portion 184 within the remote control unit 170. Said transmitted signals 102 are received thereby a first receiver 66 within the base assembly 50 and a second receiver 173 within the remote control unit 170. Heating commands are received via the wireless signal 102 and are in turn used to energize a low-power relay 115, a medium power relay 120, or a high power relay 125. These relays 115, 120, 125 receive the appropriate power from a power regulator 130 to generate the appropriate amount of power within the heating pad layer 29 to generate the appropriate heating condition. However, power is first routed through a high temperature limit thermostat 135 which is set at a pre-determined temperature, preferably being approximately sixty-eight (68° F.) degrees Fahrenheit. In such a manner, the high temperature limit thermostat 135 will disengage electrical power to the heating pad layer 29 should dangerous temperature conditions exist which may result in possible harm to the child 150. A thermistor 140 is provided and wired to the first controller 100, thereby allowing wireless communication and display of the temperature of the heating pad layer 29 as conveyed thereupon the alphanumeric display 180 (see FIG. 4). Said first infrared light transmitting diode 105 and its associated first infrared driver 110, in turn transmits temperature and battery life data thereto a second receiver portion 173 of the remote control unit 170.

The remote control unit 170 comprises an internal second controller 188 which receives power therefrom an internal second battery 194 envisioned to be a small rechargeable or disposable type. In a similar manner as the aforementioned first controller 100, the second controller portion 188 of the remote control unit 170 receives and transmits data and operating commands via electrical communication therewith a second infrared light transmitting diode 184 and its corresponding second infrared driver 186. Said second infrared light transmitting diode 184 is located along a side surface of said remote control unit 170 (see FIG. 4). A data signal 102 therefrom the first infrared light transmitting diode portion 105 is received by the second receiver 173, thereby enabling display of said temperature and battery life information thereupon the respective alphanumeric display 180 and battery strength display 182.

The second controller 188 also receives a conducted input therefrom the two (2) electronic control switches 178 being wired thereto in a parallel manner. The second controller 188 comprises an output circuit which conducts power thereto the respective indicating lights 176 to communicate the selected heating level of the apparatus 10. The second controller 188 comprises another output circuit providing power thereto a first digital display driver 190 which generates the necessary electrical signals to display an actual temperature of the heating pad layer 29 thereupon the alphanumeric display 180. The second controller 188 comprises yet another output circuit which provides power and data thereto a second digital display driver 192 which in turn powers the battery strength display 182.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the apparatus 10 would be manufactured as an original equipment portion of a new car seat and installed in general accordance with FIG. 1 through FIG. 3.

The method of installing the apparatus 10 may be achieved by performing the following steps: charging and installing the first battery 62 thereinto the first battery compartment 58 and securing using the first battery compartment door 59; installing one (1) or more fresh second batteries 194 thereinto the remote control unit 170 and securing using the second battery compartment door 195; installing the base assembly portion 50 of the apparatus 10 therewithin a vehicle in a forward-facing orientation by routing an existing vehicle seatbelt 200 therethrough the seatbelt tunnel feature 54 of the base assembly 50; latching and tightening said vehicle seatbelt 200 in a normal manner; securing the car seat assembly 15 thereto the base portion 20, if not previously installed, by initially engaging the rear latching features 80, 82 then engaging the front latching features 84, 86, wherein the first electrical connector 94 couples therewith the second electrical connector 96; and, verifying that the spring-loaded release clasp 41 is latched securely thereto the corresponding release catch 56. At this point in time the apparatus 10 is ready for actual use by a child 150.

The method of utilizing the apparatus 10 to provide controlled heating thereto the apparatus 10 may be achieved by performing the following additional steps: preheating the apparatus 10, if desired, before placing the child 150 thereinto the car seat assembly 15; loading and securing a child 150 thereinto the car seat assembly 15 by securing the shoulder straps 23 and the crotch strap 25 using the strap latch 27; monitoring the status of the apparatus 10 by viewing the operating control panel portion 174 of the remote control unit 170; observing the actual operating temperature of the heating pad layer 29 as viewed upon the alphanumeric display 180; adjusting the operating parameters of the apparatus 10 using the increment/decrement electronic control switches 178 on the operating control panel 174; de-energizing the apparatus 10 using said electronic control switches 178 to select an "OFF" condition as displayed by the corresponding indicator light 176; recharging the first battery 62 dependent upon the condition of the rechargeable first battery 62 as displayed thereupon the battery strength display 182; and, benefiting therefrom improved heated comfort experienced thereby a child 150 while occupying the apparatus 10 during cold weather conditions.

The parent or care provider may choose to eliminate or reduce the amount of exterior clothing such as coats, worn by the child 150 due to the key abilities of the apparatus 10. Such reduction also provides an added benefit of decreased bulk around the child 150 and allows for improved comfort and easier fastening of the restraining strap portions 23, 25 of the car seat assembly 15.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A heatable child car seat apparatus comprising:
a base assembly including a first control unit;
a car seat assembly attached to said base assembly, said car seat assembly having seating and back surfaces respectively, said car seat assembly further having an internal heating pad layer located along said seating and back surfaces respectively, further comprising:
a release clasp attached to said car seat assembly;
a release catch located at said base assembly;
a first rear latch attached to said car seat assembly;
a second rear latch located at said base assembly and being removably interlocked to said first rear latch;
a first front latch statically connected to said car seat assembly; and,
a second front latch located at a top surface of said base assembly and being removably interlocked to said first front latch;
a first power source mounted within said base assembly;
a plurality of internal heating elements situated within said seating and back surfaces and being electrically coupled to a first battery;
a remote control unit adapted to provide selectable temperature settings to said first control unit and display an actual heated temperature of said car seat assembly;
a male first connector located at said base assembly and coupled to said first power source; and,
a female second connector located at said car seat assembly and coupled to said heating elements;
wherein said male first connector is mated with said female first connector and thereby conducts electricity from said first power source to said heating elements; and,
wherein said first control unit is in two-way wireless communication with a second control unit of said remote control unit for conveying a present operating status of said heatable child car seat apparatus.

2. The heatable child car seat apparatus of claim 1, wherein said release clasp and said release catch are located along front surfaces of said car seat assembly and base assembly respectively.

3. The heatable child car seat apparatus of claim 1, wherein said heating elements are located within said heating pad layer.

4. The heatable child car seat apparatus of claim 1, wherein said remote control unit comprises:
a second battery; and,
an operating control panel located on a face of said remote control unit;
wherein said first control unit of said base assembly generates and transmits a first signal to said remote control unit for conveying a present operating status of said heatable child car seat apparatus; and,
wherein said present operating status includes a real-time temperature of said heating pad layer and a strength of said first battery.

5. A heatable child car seat apparatus comprising:
a base assembly including a first control unit;
a car seat assembly removably attached to said base assembly, said car seat assembly having seating and back surfaces respectively, said car seat assembly further having an internal heating pad layer located along said seating and back surfaces respectively, further comprising:
a release clasp attached to said car seat assembly;
a release catch located at said base assembly;
a first rear latch attached to said car seat assembly;
a second rear latch located at said base assembly and being removably interlocked to said first rear latch;
a first front latch statically connected to said car seat assembly; and,
a second front latch located at a top surface of said base assembly and being removably interlocked to said first front latch;
a first power source mounted within said base assembly;
a plurality of internal heating elements situated within said seating and back surfaces and being electrically coupled to a first battery;
a remote control unit adapted to provide selectable temperature settings to said first control unit and display an actual heated temperature of said car seat assembly;
a male first connector located at said base assembly and electrically coupled to said first power source; and,
a female second connector located at said car seat assembly and electrically coupled to said heating elements;
wherein said male first connector is mated with said female first connector and thereby conducts electricity from said first power source to said heating elements when said car seat assembly is attached to said base assembly; and,
wherein said first control unit is in two-way wireless communication with a second control unit of said remote control unit for conveying a present operating status of said heatable child car seat apparatus.

6. The heatable child car seat apparatus of claim 5, wherein said release clasp and said release catch are located along front surfaces of said car seat assembly and base assembly respectively.

7. The heatable child car seat apparatus of claim 5, wherein said heating elements are located within said heating pad layer.

8. The heatable child car seat apparatus of claim 5, wherein said remote control unit comprises:
a second battery; and,
an operating control panel located on a face of said remote control unit;
wherein said first control unit of said base assembly generates and transmits a first signal to said remote control unit for conveying a present operating status of said heatable child car seat apparatus; and,
wherein said present operating status includes a real-time temperature of said heating pad layer and a strength of said first battery.

9. A method for utilizing a heatable child car seat apparatus, said method comprises the steps of:
providing a base assembly including a first control unit;
providing and removably attaching a car seat assembly to said base assembly, said car seat assembly having seating and back surfaces respectively, said car seat assembly further having an internal heating pad layer located along said seating and back surfaces respectively, a release clasp attached to said car seat assembly, a release catch located at said base assembly, a first rear latch attached to said car seat assembly, a second rear latch located at said base assembly and being removably interlocked to said first rear latch, a first front latch statically connected to said car seat assembly, and a second front latch located at a top surface of said base assembly and being removably interlocked to said first front latch;

providing and mounting a first power source within said base assembly;

providing and situating a plurality of internal heating elements within said seating and back surfaces;

electrically coupling said heating elements to a first battery;

providing and adapting a remote control unit to provide selectable temperature settings to said first control unit via two-way wireless communication with a second control unit of said remote control unit such that said remote control unit displays an actual heated temperature of said car seat assembly;

providing and locating a male first connector at said base assembly;

electrically coupling said male first connector to said first power source;

providing and locating a female second connector at said car seat assembly;

electrically coupling said female second connector to said heating elements;

conducting electricity from said first power source to said heating elements when said car seat assembly is attached to said base assembly by mating said male first connector with said female first connector; and, conveying a present operating status of said heatable child car seat apparatus by maintaining said first control unit in two-way communication with said remote control unit.

* * * * *